(12) United States Patent
Ueda et al.

(10) Patent No.: US 7,765,276 B2
(45) Date of Patent: Jul. 27, 2010

(54) COMMUNICATION APPARATUS AND BROWSER SWITCHING METHOD

(75) Inventors: Makoto Ueda, Kawasaki (JP); Yoshiaki Hiramatsu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 582 days.

(21) Appl. No.: 11/453,888

(22) Filed: Jun. 16, 2006

(65) Prior Publication Data
US 2006/0288083 A1 Dec. 21, 2006

(30) Foreign Application Priority Data
Jun. 17, 2005 (JP) .......................... P2005-178220

(51) Int. Cl.
*G06F 15/16* (2006.01)
(52) U.S. Cl. ........................ 709/217; 709/218; 709/219
(58) Field of Classification Search .................. 709/217
See application file for complete search history.

(56) References Cited

U.S. PATENT DOCUMENTS

| | | | |
|---|---|---|---|
| 6,225,995 B1 * | 5/2001 | Jacobs et al. ................. 715/738 |
| 6,477,550 B1 * | 11/2002 | Balasubramaniam et al. .... 715/234 |
| 6,880,110 B2 * | 4/2005 | Largman et al. .............. 714/38 |
| 7,032,036 B2 * | 4/2006 | Linsley ....................... 709/250 |
| 7,260,774 B2 * | 8/2007 | Lambert et al. ............. 715/234 |
| 2002/0194262 A1 * | 12/2002 | Jorgenson ................... 709/203 |
| 2003/0154135 A1 * | 8/2003 | Covington et al. ........... 705/26 |
| 2005/0066037 A1 * | 3/2005 | Song et al. .................. 709/227 |
| 2005/0235044 A1 * | 10/2005 | Tazuma ...................... 709/217 |
| 2006/0039384 A1 * | 2/2006 | Dontu et al. ................. 370/400 |
| 2006/0059416 A1 * | 3/2006 | Lin ........................... 715/501.1 |
| 2006/0168540 A1 * | 7/2006 | Cejka et al. ................. 715/786 |

(Continued)

FOREIGN PATENT DOCUMENTS

JP 11-15787 1/1999

(Continued)

OTHER PUBLICATIONS

Van Geijtenbeek, "Re: way to re-open (while in opera) in IE?—Message-ID: <opsh91p3ne55487u@anuta5-xp.oslo.opera.com>", Newsgroup Message, [Online], Retrieved from the internet: URL;http://groups.google.com/group/opera.general/msg/3ff9c0c5a75984b5?dmode=source&output=gplain>, XP-002404340, Nov. 30, 2004, 1 page.

(Continued)

*Primary Examiner*—Firmin Backer
*Assistant Examiner*—Arvin Eskandarnia
(74) *Attorney, Agent, or Firm*—Oblon, Spivak, McClelland, Maier & Neustadt, L.L.P.

(57) ABSTRACT

The communication apparatus and browser switching method are capable of carrying out automatically an input of URL. A mobile device communicates with a server arranged in a network and has a first browser that processes and displays Web data acquired from the server, and a second browser that can process Web data that can not be processed by the first browser. In this mobile device, when a switching instruction is received from an operation part, a URL being a communication destination communicated with the first browser for communication is stored in a URL storage part. An application management part controls the second browser such that the second browser performs communication connection to the URL based on the stored URL.

4 Claims, 2 Drawing Sheets

U.S. PATENT DOCUMENTS

2006/0224967 A1* 10/2006 Marmaros .................. 715/738

FOREIGN PATENT DOCUMENTS

| KR | 2001-0074929 | 8/2001 |
| KR | 2001-0086893 | 9/2001 |
| KR | 2002-0004924 | 1/2002 |
| KR | 2002-0037476 | 5/2002 |
| WO | WO 01/03001 A1 | 1/2001 |

OTHER PUBLICATIONS

A. Klatt, Re: When will print selection work?-Message-ID: <oproplbgr4m1z6s@news.opera.com>, Newsgroup Message, [Online], Retrieved from the internet: URL:http://groups.google.com/group/opera.general/msg/a989883e4924d7f9?dmode+source&h1=en&output+gplain>, XP-002404342, May 5, 2003, 1 page.

A. Kolthoff, et al., "Re: Opera not integrating with DAP-Message-ID: <SSYPD2098D92@sisyphus.ping.de>", Newsgroup Message, [Online], Retrieve from the Internet: URL:http://groups.google.com/group/opera.general/msg/b3bcdf2680b9bfe6?demode=source&h1=en&output=gplain>, XP002404343, Apr. 28, 2003, 1 page.

http://toget.pchome.com.tw/intro/network www/network www plugin/23846.html, IEView, IEView—Firefox, IEview application software developed by Mozdev.org software group., Apr. 25, 2005, 3 pages, with English translation.

Martin Larsen. "Welcome to Optool 2.0 alpha release", Kreacom web pages, (Kreativ Kommunikation), [online], XP007906723, Apr. 11, 2005, pp. 1-5.

Anonymous, "Automatic launch on exiting", Opera Community Forum, [Online], XP007906721, Feb. 9, 2004, pp. 1-3.

* cited by examiner

COMMUNICATION APPARATUS AND BROWSER SWITCHING METHOD

BACKGROUND OF THE INVENTION

1. Field of the Invention

The present invention relates to a communication apparatus and a browser switching method for acquiring to process Web data.

2. Related Background of the Invention

Browser has been conventionally known which can acquire to display Web data from a site arranged in the Internet. Usually, when the browser is activated in a personal computer, the activated browser connects to a URL (Uniform Resource Locator) set as an initial value and acquires Web data held at a URL destination to display the Web data. Further, the browser acquires to display Web data which is input and held at the URL destination upon the user inputting an arbitrary URL in the URL input column within the browser.

Here, in some cases, the browser cannot process the acquired Web data. For example, the browser cannot process to display the Web data in the case where a function that is not supported by the browser is attached to the Web data. A typical personal computer carries a plurality of browsers. Thus, if one browser cannot process Web data, the user can start up another browser different from the one browser owing to multi-window processing and use another browser to process the Web data. Since the background art is one which does not relate to any reference or publicly known inventions, there is no prior art reference information to be described.

However, the user should input the URL again when activating the other browser, and there arises a problem of requiring much labor. Here, as a method for saving labor to input the URL, it is conceivable that the URL which has been input once to one browser is copied and then pasted into another browser. However, since a display is small in a portable terminal such as a mobile device, it is difficult to display a plurality of browsers simultaneously. Further, there are some types of terminals which do not have a multi-window function. Thus, there is a problem that the user cannot perform the copying/pasting work of URL described above, and it is difficult to move the URL which is input with the already activated browser to another browser.

Therefore, an object of the present invention is to provide a communication apparatus and a browser switching method capable of carrying out automatic input of URL.

SUMMARY OF THE INVENTION

In order to solve the aforementioned problem, a communication apparatus according to the present invention having a first browser means that processes to display Web data acquired from a site while communicating with the site arranged in a network to process and display Web data acquired from the site, and a second browser means which can process the Web data that can not be processed by the first browser means and which processes to display Web data acquired from a site while performing communication connection with the site arranged in the network, comprising: a reception means for receiving a switching instruction from a user to switch from the first browser means to the second browser means; a storing means for storing address information indicating a communication destination with which communication is performed using the first browser means when the reception means receives the switching instruction; and a control means for controlling the second browser means such that the second browser means performs a communication connection based on address information stored in the storage means.

Further, a browser switching method according to the present invention having a first browser means that processes to display Web data acquired from a site while performing communication connection with the site arranged in a network to process and display Web data acquired from the site, and a second browser means which can process the Web data that can not be processed by the first browser means and which processes to display Web data acquired from a site while performing communication connection with the site arranged in the network, comprising the steps of: receiving a switching instruction from a user to switch from the first browser means to the second browser means as a reception step; storing, when the reception means receives the switching instruction, address information indicating a communication destination communicated with the first browser means as a storing step; and performing the communication connection by the second browser means based on the address information stored at the storing step as a communication step.

According to the configuration, an instruction for switching from the first browser means to the second browser means is received from a user, when receiving the switching instruction, address information is stored which indicates a communication destination communicated with the first browser means; and the switched second browser means is capable of performing the communication connection based on the stored address information. Due to this, the user is capable of performing the communication connection to the site where the user has performed the communication connection with the first browser means, while using the second browser means, with simple operation that the switching instruction is given without inputting the same address information.

In the present invention, a user is capable of performing a communication connection to a site to which the user has performed the communication connection with a first browser means, while using a second browser means with simple operation of giving a switching instruction without inputting address information.

DESCRIPTION OF THE PREFERRED EMBODIMENTS

The present invention can be understood easily by considering following detailed descriptions while referring to appended drawings shown for one embodiment. Subsequently, there will be described an embodiment of the present invention with reference to appended drawings. If possible, like numerals refer to like parts, and duplicated explanation will be omitted.

Figure 1:
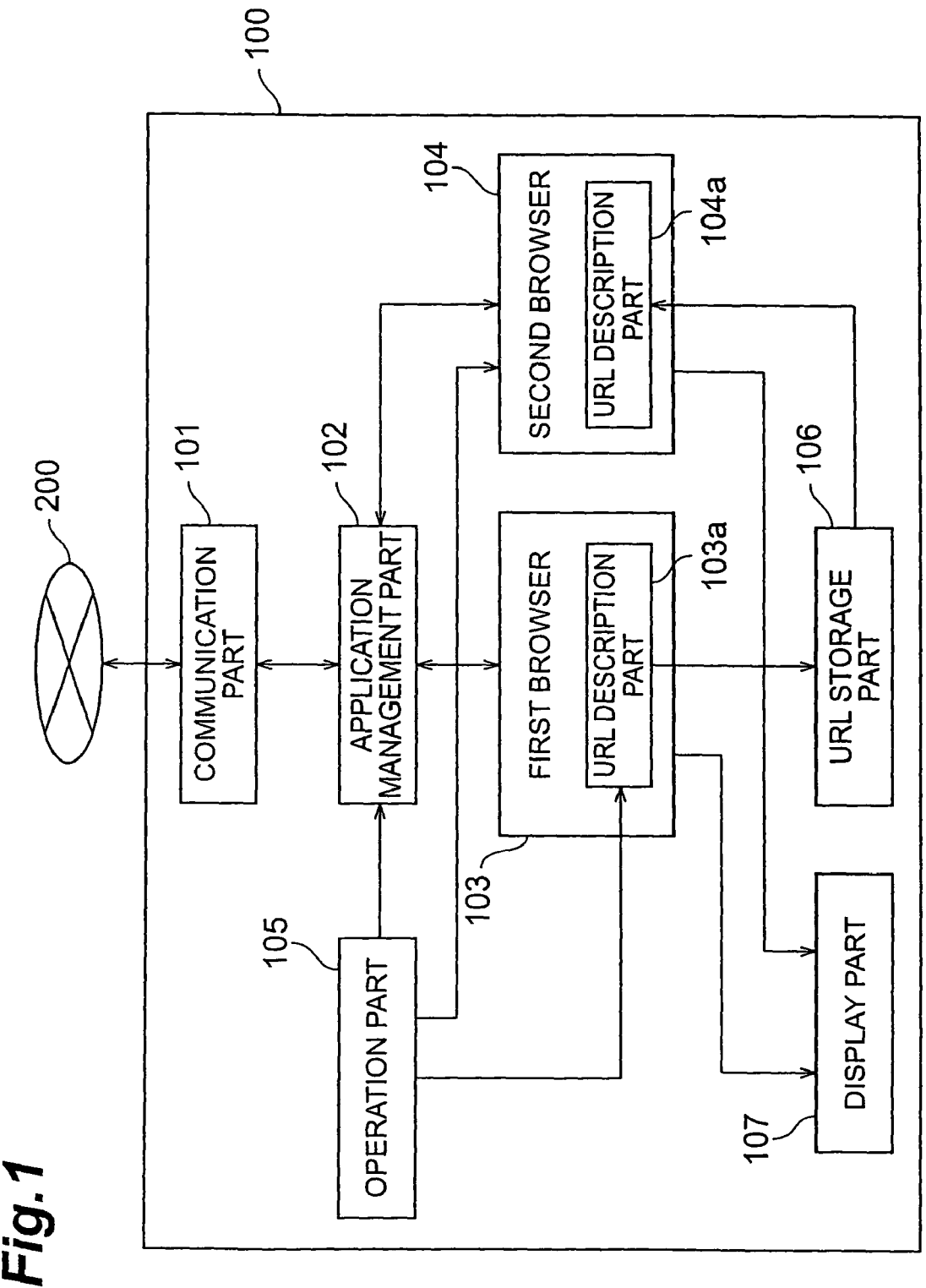
FIG. 1 is a block configuration diagram showing a mobile device 100 in the present embodiment.

FIG. 1 is a block configuration diagram of a mobile device 100 in the present embodiment. The mobile device 100 can communicate with a site (not shown) providing Web data via a public radio network 200. The mobile device 100 is configured by comprising a communication part 101, an application management part 102 (control means), a first browser 103 (first browser means), a second browser 104 (second browser means), an operation part 105 (reception means), a URL storage part 106 (storing means), and a display part 107. Each constituent part will be described below.

The communication part 101 is one for receiving Web data from a site via the public radio network 200. The communication part 101 outputs the received Web data to either the first browser or the second browser, the browser which issued an acquisition requirement of the Web data.

The application management part 102 is one for controlling the first browser 103 and the second browser 104 which are applications.

The first browser 103 and the second browser 104 have URL description parts 103a and 104a respectively, for example, address bars, and are configured such that the user can describe URLs.

The application management part 102 activates or switches the first browser 103 or second browser 104 stored in a memory (not shown) according to an activation instruction or switching instruction from the operation part 105. Then, the application management part 102 displays the Web data processed by the activated first browser 103 or second browser 104 on the display part 107.

Furthermore, when the application management part 102, in the state that the first browser 103 is activated, receives a browser switching instruction to switch from the first browser 103 to the second browser 104 due to a user's operation, the application management part 102 causes the URL storage part 106 to store the URL while outputting the URL described in the URL description part 103a of the first browser 103 to the URL storage part 106. Then, the application management part 102 terminates the first browser 103 after the URL is stored in the URL storage part 106, and outputs a switching instruction so as to switch and activate the second browser 104 to activate the second browser 104.

The application management part 102, when giving the switching instruction activates the second browser 104, fetches the URL stored in the URL storage part 106 and describes it in the URL description part 104a of the second browser 104. Then, the application management part 102 controls the second browser 104 so as to perform a communication connection based on the URL described in the URL description part 104a. In addition, in the case that the application management part 102 causes the second browser 104 to perform not the switching instruction but the normal activation, the application management part 102 causes the communication connection to take place by describing the URL based on an initial setting value set to the second browser 104 in the URL description part 104a.

Here, the second browser 104 is a browser having a higher functionality than the first browser 103. For instance, the second browser 104 can cope with many types of image files and perform high-functionality data processing on images and animation.

The operation part 105 is composed of a keypad operated by the user, the URL is written by the user using the operation part 105, operation to the first browser 103 is performed, and the activation instruction or switching instruction of the browser is performed. Further, the operation part 105 can perform an operation to the second browser 104 and the user can similarly inputs the URL into the second browser 104 using the operation part 105.

The URL storage part 106 is one for storing a URL output from the first browser 103, and the display part 107 is one for displaying Web data processed by the first browser and second browser.

Figure 2:
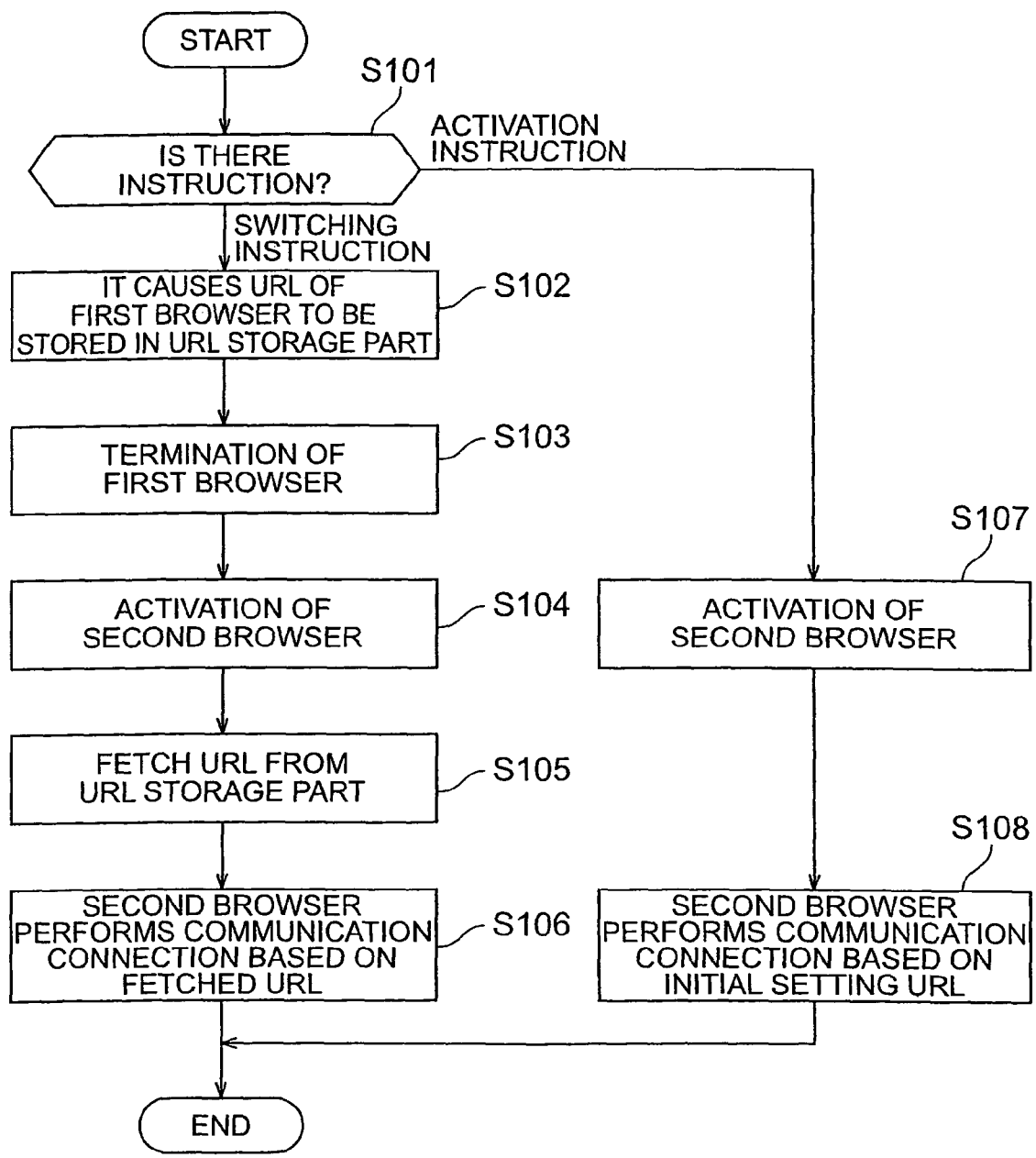
FIG. 2 is a flow chart showing an operation of the mobile device 100.

There will be described operations of the mobile device 100 configured as described above. FIG. 2 is a flow chart showing the operation of the mobile device 100. The application management part 102 activates the first browser 103 based on a user's operation, and the first browser 103 accesses arbitrary site based on a URL input by the user. Here, the application management part 102 determines whether or not any one of a switching instruction and an activation instruction for the second browser 104 has been given by the operation part 105 (S101). Here, when it is determined that a browser switching instruction has been given by the user's operation (S101: switching instruction), the URL input by the user to the first browser 103 is output to the URL storage part 106 by the first browser 103 and the URL is stored in the URL storage part 106 (S102).

After the URL is stored in the URL storage part 106, a termination instruction of the first browser 103 is given by the application management part 102 and the first browser 103 terminates (S103). After the first browser 103 terminates, a browser switching instruction to switch from the first browser 103 to the second browser 104 is output by the application management part 102 and, upon receipt of the instruction, the second browser 104 is activated (S104). Then, in the second browser 104, the URL stored in the URL storage part 106 is fetched (S105) and the fetched URL is written into the URL description part 104a of the second browser 104 by the application management part 102 as a communication connection destination. Subsequently, the second browser 104 performs communication connection to a site based on the fetched URL (S106).

In S101, when the application management part 102 determines that a normal activation signal of the second browser 104 has been output by the operation part 105, the second browser 104 is activated by the application management part 102 (S107). In this case, in the second browser 104, no URL is fetched from the URL storage part 106 and communication connection is performed based on the URL determined as the initial setting within the second browser 104 (S108).

Incidentally, the above-mentioned embodiment has been described by assuming that the second browser 104 is activated newly, but the present invention is not limited to this aspect. That is, in the state that the first browser 103 and the second browser 104 are activated beforehand, when a browser switching instruction is output by the application management part 102, communication connection may be performed in such a way that processing to fetch the URL from the URL storage part 106 is performed by the second browser 104 without executing any steps to perform activation processing for the second browser 104.

Next, an operation and effect of the mobile device 100 in the present embodiment will be described. The mobile device 100 in the present embodiment receives a switching instruction to switch from the first browser 103 to the second browser 104 from the user via the operation part 105, upon receiving the switching instruction, stores the URL indicating a communication destination communicated with the first browser 103, and the switched second browser 104 is capable of performing the communication connection based on the stored URL. This allows the communication connection using the second browser 104 to the site in which the communication connection was performed with the first browser 103 by a simple operation such as giving a switching instruction without inputting any URL.

What is claimed is:
1. A communication apparatus comprising:
   a communication interface configured to acquire Web data from a site while communicating with the site arranged on a network;
   a user interface configured to receive a switching instruction to switch from a first browser to a second browser, wherein said second browser is a different browser from said first browser and is configured to display the Web data acquired from the site via the network, which is not capable of being displayed by said first browser;

a memory configured to store address information indicating a communication destination with which communication is performed using the first browser when the user interface receives the switching instruction; and a controller configured to automatically terminate the first browser in response to receiving the switching instruction and control an activation of the second browser such that the second browser performs a communication connection based on the address information stored in the memory.

2. The apparatus of claim 1, wherein the controller is not capable of operating the first browser and the second browser simultaneously.

3. A communication apparatus browser switching method, comprising:

acquiring, at a communication interface of a communication apparatus, Web data from a site while communicating with the site arranged on a network;

receiving, at a user interface of the communication apparatus, a switching instruction to switch from a first browser to a second browser, wherein said second browser is a different browser from said first browser and is configured to display the Web data acquired from the site via the network, which is not capable of being displayed by said first browser;

storing, at a memory of the communication apparatus, address information indicating a communication destination communicated with the first browser when the switching instruction is received; and controlling, at a controller of the communication apparatus, automatic termination of the first browser in response to receiving the switching instruction and activation of the second browser such that the second browser performs a communication connection based on the address information stored at the memory.

4. The method of claim 3, wherein the communication apparatus is not capable of operating the first browser and the second browser simultaneously.

* * * * *